(12) United States Patent
Liu et al.

(10) Patent No.: US 7,733,919 B2
(45) Date of Patent: Jun. 8, 2010

(54) METHOD AND APPARATUS FOR PROCESSING TRANSPORT STREAM PACKETS TO COMPENSATE FOR JITTER

(75) Inventors: Vincent C. Liu, San Diego, CA (US); Robert S. Nemiroff, Carlsbad, CA (US); Guofei Wu, San Diego, CA (US)

(73) Assignee: General Instrument Corporation, Horsham, PA (US)

( * ) Notice: Subject to any disclaimer, the term of this patent is extended or adjusted under 35 U.S.C. 154(b) by 1387 days.

(21) Appl. No.: 10/889,502

(22) Filed: Jul. 12, 2004

(65) Prior Publication Data

US 2006/0007960 A1   Jan. 12, 2006

(51) Int. Cl.
*H04J 3/06*   (2006.01)
*H04N 7/16*   (2006.01)

(52) U.S. Cl. ........................ 370/516; 725/147
(58) Field of Classification Search ................ 370/503, 370/516–517, 521, 374–376
See application file for complete search history.

(56) References Cited

U.S. PATENT DOCUMENTS

| | | | |
|---|---|---|---|
| 5,805,602 A * | 9/1998 | Cloutier et al. ............. 370/516 |
| 6,081,650 A * | 6/2000 | Lyons et al. ................ 386/95 |
| 6,385,198 B1 * | 5/2002 | Ofek et al. ................. 370/389 |
| 6,542,550 B1 * | 4/2003 | Schreiber ............... 375/240.26 |
| 7,173,945 B1 * | 2/2007 | Liu et al. .................... 370/516 |
| 2001/0043621 A1 * | 11/2001 | Anderson et al. .......... 370/516 |
| 2002/0034195 A1 * | 3/2002 | Chen et al. ................. 370/519 |
| 2002/0064186 A1 * | 5/2002 | Aoyagi et al. .............. 370/521 |
| 2003/0030475 A1 * | 2/2003 | Ishikawa .................... 327/291 |
| 2003/0169777 A1 * | 9/2003 | Fuse .......................... 370/516 |
| 2003/0223466 A1 * | 12/2003 | Noronha et al. ............ 370/537 |
| 2005/0057571 A1 * | 3/2005 | Stevens ...................... 345/501 |

* cited by examiner

*Primary Examiner*—Seema S Rao
*Assistant Examiner*—Xavier Szewai Wong
(74) *Attorney, Agent, or Firm*—Stewart M. Wiener (57) ABSTRACT

Method and apparatus for processing transport stream packets received from a network for distribution to user terminals is described. In one embodiment, a pair of clock reference packets in the transport stream packets is identified. The pair of clock reference packets includes a first clock reference packet having an output time stamp and a second clock reference packet. A difference between a time value of the second clock reference packet and a time value of the first clock reference packet is computed. An output time stamp for the second clock reference packet is calculated in response to the output time stamp of the first clock reference packet and the difference.

12 Claims, 5 Drawing Sheets

METHOD AND APPARATUS FOR PROCESSING TRANSPORT STREAM PACKETS TO COMPENSATE FOR JITTER

BACKGROUND OF THE INVENTION

1. Field of the Invention

The present invention generally relates to processing digital video signals and, more particularly, to a method and apparatus for processing transport stream packets to compensate for jitter.

2. Description of the Related Art

Commonly, transport streams carrying encoded digital video data are transmitted over packet-based networks, such as an Ethernet network. For example, each Ethernet frame may carry multiple transport stream packets. Due variable transmission delays experienced by the Ethernet frames, individual transport stream packets suffer from variable delays at the receiving equipment, referred to as "jitter". Jitter deleteriously affects the processing and decoding of video data carried by the transport stream packets. As such, the receiving equipment must compensate for the jitter before distributing the transport stream packets to user terminals.

In a digital video compression system, such as the MPEG-2 system, the digital video source is clocked at 27 MHz. If an MPEG-2 transport stream was generated at a constant bit-rate, the receiving equipment may determine the fixed bit-rate of the stream by counting the number of packets between any two program clock reference (PCR)-carrying packets and dividing that number by the time difference of the two PCR packets. The time difference (in seconds) is the difference between the two PCR values divided by 27,000,000:

constant bit-rate (bits/sec)=188×8×(# of packets between two PCR's +1)/ (time difference between two PCR's).

Once the constant bit-rate has been calculated, the "dejittering" of the transport packets at the receiving end can be performed by storing the received packets in a buffer and metering out the packets at a fixed rate. The output packet rate (in packets per second) is related to the constant transport rate as:

Output packet rate (pkt/sec)=transport rate (bits/sec)/ (188×8).

However, if the transmitted transport stream is of variable rate in nature, the above method cannot be applied. Moreover, with some video-on-demand (VOD) servers, the "trick-play modes" (e.g., fast-forward, rewind, etc.) may be of variable rate and have no maximum limit on the interval between two PCR-packets. The above method does not effectively compensate for such trick-play modes.

Accordingly, there exists a need in the art for a method and apparatus that compensates for jitter in variable bit-rate streams and transport streams subject to trick-play modes in addition to constant bit-rate streams.

SUMMARY OF THE INVENTION

Method and apparatus for processing transport stream packets received from a network for distribution to user terminals is described. In one embodiment, a pair of clock reference packets in the transport stream packets is identified. The pair of clock reference packets includes a first clock reference packet having an output time stamp and a second clock reference packet. A difference between a time value of the second clock reference packet and a time value of the first clock reference packet is computed. An output time stamp for the second clock reference packet is calculated in response to the output time stamp of the first clock reference packet and the difference.

BRIEF DESCRIPTION OF THE DRAWINGS

So that the manner in which the above recited features of the present invention can be understood in detail, a more particular description of the invention, briefly summarized above, may be had by reference to embodiments, some of which are illustrated in the appended drawings. It is to be noted, however, that the appended drawings illustrate only typical embodiments of this invention and are therefore not to be considered limiting of its scope, for the invention may admit to other equally effective embodiments.

To facilitate understanding, identical reference numerals have been used, wherever possible, to designate identical elements that are common to the figures.

DETAILED DESCRIPTION OF THE INVENTION

Figure 1:
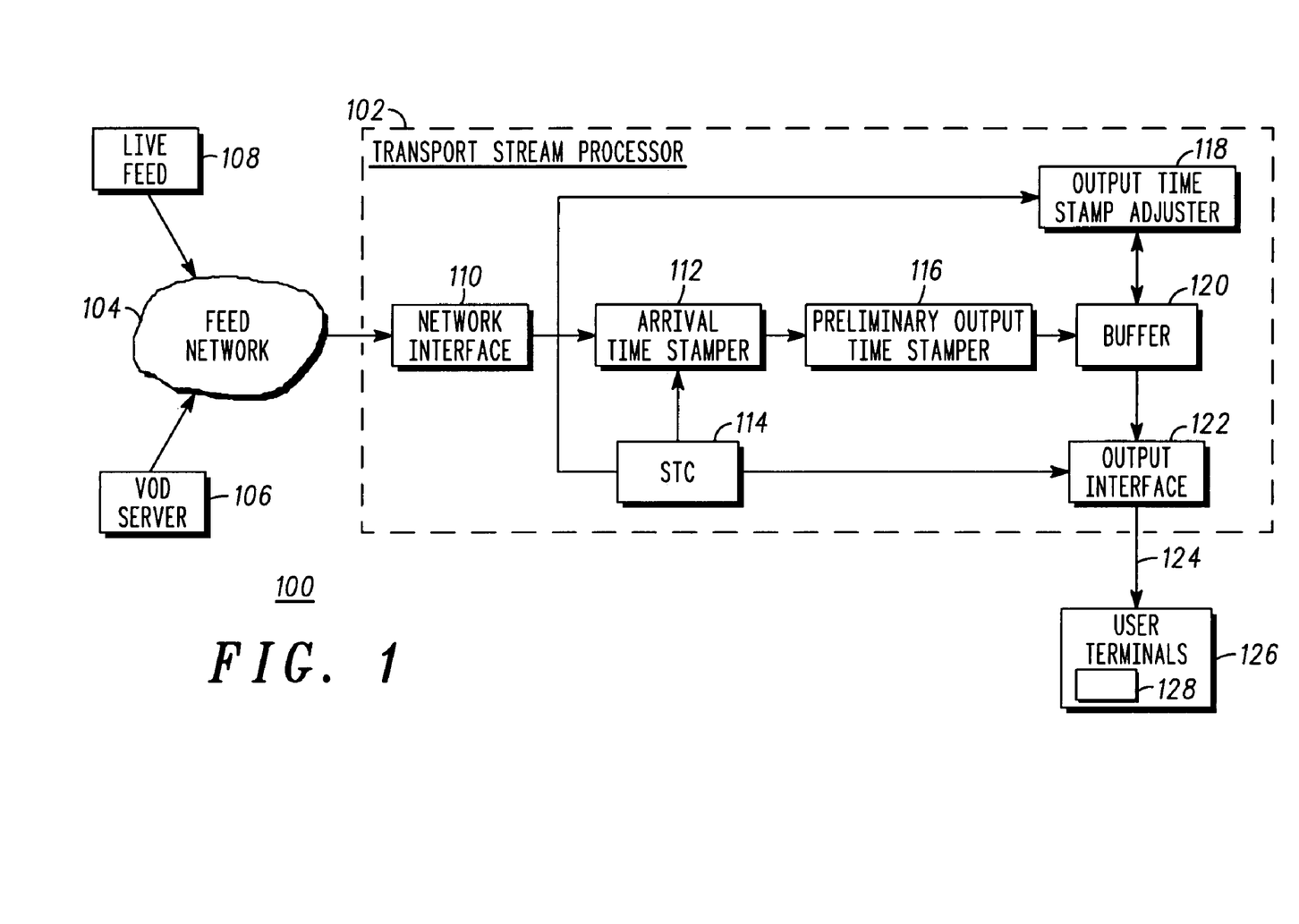
FIG. 1 is a block diagram depicting an exemplary embodiment of a video distribution system constructed in accordance with the invention

FIG. 1 is a block diagram depicting an exemplary embodiment of a video distribution system 100 constructed in accordance with the invention. The video distribution system 100 comprises feed network 104, a transport stream processor 102, a distribution network 124, and a plurality of user terminals 126. The feed network 104 provides digital transport streams carrying encoded video data to the transport stream processor 102. The video data may be encoded using various coding techniques that comply with well known standards developed by the Motion Picture Experts Group (MPEG) and International Telecommunications Union (ITU-T), such as MPEG-1, MPEG-2, MPEG-4, ITU-T H261, and ITU-T H263 standards. For purposes of clarity by example, the invention is described herein with respect to MPEG-2 transport streams, the format of which is well-known in the art. The feed network 104 receives the digital transport stream data from at least one video source, such as a video-on-demand (VOD) server 106 and/or a live feed 108.

The feed network 104 comprises a packet-based communication network, such as an Ethernet network (e.g., 10BaseT, 100BaseT, Gigabit). For purposes of clarity by example, the feed network 104 is described herein as being an Ethernet network. It is to be understood, however, that other types of well-known packet-based communication networks may also be employed. The transport stream (TS) packets are assembled into larger Ethernet frames. Notably, each frame may include one or more TS packets (hereinafter referred to as a "group" of TS packets). In one embodiment, each frame may carry up to seven TS packets (i.e., up to seven packets per group).

The transport stream processor 102 receives Ethernet frames from the feed network 104. The transport stream processor 102 extracts the TS packets from the received frames and processes the TS packets to remove jitter. Notably, individual frames propagating through the feed network 104 experience variable delays through the feed network 104, which causes jitter in the received TS packets. The transport stream processor 102 processes the received TS packets and distributes the TS packets to the user terminals 126 via the distribution network 124 in a manner that substantially reduces or eliminates jitter. The distribution network 124 may comprise any type of well known video distribution network, such as a hybrid fiber-coax (HFC) network, satellite network, and the like. Each of the user terminals 126 includes receiver/decoder circuitry 128 for processing the TS packets distributed by the transport stream processor 102.

In particular, the transport stream processor 102 comprises a network interface 110, an arrival time stamper 112, a preliminary output time stamper 116, a system time clock (STC) 114, a buffer 120, an output time stamp adjuster 118, and an output interface 122. The network interface 110 is configured to receive frames from the feed network 104. The network interface 110 extracts groups of TS packets from received frames. The arrival time stamper 112 is configured to receive groups of TS packets from the network interface 110. The arrival time stamper 112 provides an arrival time stamp for each group of TS packets in accordance with a time signal provided by the STC 114. In the present example, the STC 114 comprises a 27 MHz clock, as set forth by the MPEG-2 standard.

The preliminary output time stamper 116 is configured to receive groups of TS packets having arrival time stamps from the arrival time stamper 112. The preliminary output time stamper 116 appends a preliminary output time stamp to each TS packet in each received group. The preliminary output time stamper 116 inserts the TS packets having preliminary output time stamps into the buffer 120. A "preliminary output time stamp" refers to time at which the respective TS packet may be transmitted by the transport stream processor 102 towards the user terminals 126 at set forth by the STC 114. The time stamps assigned by the preliminary time stamper 116 are referred to as being "preliminary," since such time stamps may be adjusted subsequently by the output time stamp adjuster 118, as described below. The preliminary output time stamps only ensure that the TS packets within a given group are uniformly spaced. The preliminary output time stamper 116 does not remove any jitter incurred due to transmission of the TS packets through the feed network 104.

Notably, the first group of TS packets received by the preliminary output time stamper 116 is disassembled from the very first Ethernet frame received by the network interface 110. The first TS packet in the group is given a preliminary output time stamp that is equal to the arrival time of the group (as determined by the arrival time stamper 112) plus a fixed initial (nominal) buffer delay. In one embodiment, each of the remaining TS packets in the first group has a preliminary output time stamp that equals the preceding packet's preliminary output time stamp plus 400 microseconds. The 400-microsecond spacing corresponds to an MPEG-2 bitrate of 3.75 Mbps. It is to be understood that other spacings may be employed to achieve other bitrates. The last TS packet from the first group includes a preliminary output time stamp that is equal to:

$$\text{first group arrival time} + \text{nominal buffer delay} + (M-1) \\ *0.0004 \text{ seconds},$$

where M represents the number of TS packets in the first group. From the above, it is apparent that the last TS packet in the first group has a preliminary output time stamp that is at least equal to the first group's arrival time plus the initial buffer delay.

For the TS packets in the second group of TS packets (i.e., the TS packets in the next received Ethernet frame), the preliminary output time stamps are derived from the last preliminary output time stamp of the first group plus a spacing factor. This spacing factor is given by:

$$(\text{arrival time of second group} - \text{arrival time of first group})/(\text{number of TS packets within second group})$$

This spacing ensures that the last TS packet of this second group will have a preliminary output time stamp of:

$$\text{first group arrival time} + \text{initial buffer delay} + (M-1) \\ *0.0004 \text{ seconds} + (\text{second group arrival time} - \text{first group arrival time}).$$

The above-defined preliminary output time stamp is reduced to:

$$\text{second group arrival time} + \text{initial buffer delay} + (M-1) \\ *0.0004 \text{ seconds}.$$

Therefore the last TS packet in the second group is guaranteed a preliminary output time stamp that is at least its arrival time plus the initial buffer delay. In other words, the buffer delay for the last TS packet in the second group is at least equal to the initial buffer delay.

For each subsequent group of TS packets received (i.e., for subsequent Ethernet frames), the associated TS packets will have a spacing factor equivalent to:

$$(\text{arrival time of current group} - \text{arrival time of previous group})/(\text{number of TS packets within current group}) \qquad [1]$$

The last TS packet in each group of TS packets has a buffer delay that is greater than, or equal to, the initial buffer delay. The TS packets before the last TS packet may have buffer delay that is shorter than the initial buffer delay.

In some cases, the last TS packet in a group of TS packets may not be a PCR-packet. For the time stamp adjustment process performed by the output time stamp adjuster 118, the first PCR-packet of a new transport stream should have a buffer delay equal to the nominal buffer delay. To enforce this, the preliminary output time stamper 116 may be configured to append a preliminary output time stamp to the first received PCR-packet equal to its arrival time plus the nominal buffer delay. Having fixed the preliminary output time stamp for the first PCR-packet, the subsequent TS packets of the same group include preliminary output time stamps that are spaced 400 microseconds apart. The TS packets arriving in subsequent groups include preliminary output time stamps spaced in accordance with Equation [1] described above.

Figure 2:
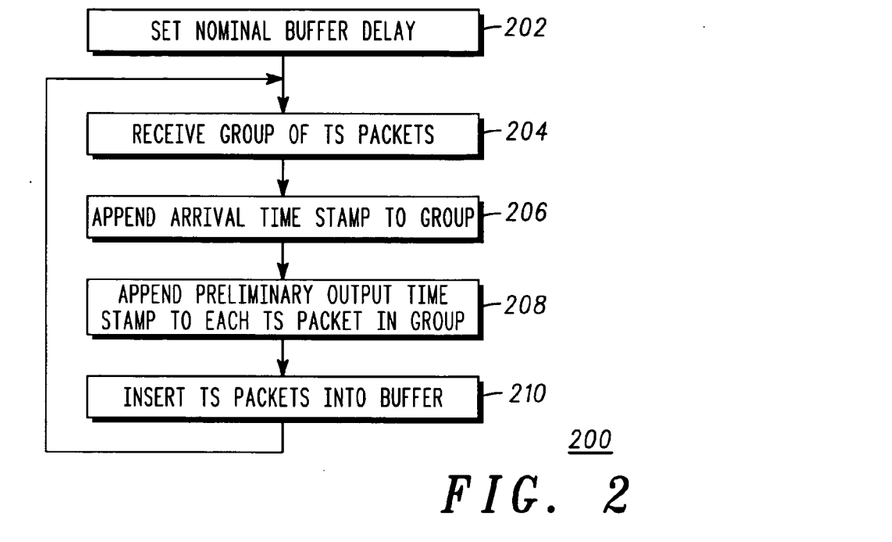
FIG. 2 is a flow diagram depicting an exemplary embodiment of a method for processing transport stream packets received from a packet-based feed network in accordance with the invention.

FIG. 2 is a flow diagram depicting an exemplary embodiment of a method 200 for processing TS packets received from a packet-based feed network in accordance with the invention. The method 200 begins at step 202, where a nominal buffer delay is set. At step 204, a group of TS packets is received. At step 206, an arrival time stamp is appended to the received group of TS packets. At step 208, a preliminary output time stamp is appended to each TS packet in the received group. The preliminary output time stamps are computed in response to the nominal buffer delay and the arrival time stamps, as discussed above. At step 210, the TS packets are inserted into a buffer (e.g., the buffer 120). The method 200 then returns to step 204 and repeats for each received group of TS packets.

Returning to FIG. 1, the output time stamp adjuster 118 is configured to access TS packets in the buffer 120. The output time stamp adjuster 118 adjusts the output time stamps of the TS packets in accordance with an output time stamp adjustment process, described below, to substantially reduce or eliminate jitter. Notably, the output time stamp adjuster 118 adjusts the output time stamps of TS packets in the buffer 120 carrying program clock reference (PCR) data ("PCR-packets") to the correct values as dictated by the PCR values. The output time stamp adjuster 118 adjusts the output time stamps of TS packets between PCR-packets for uniform spacing. The output interface 124 extracts TS packets from the buffer 120 and transmits the TS packets over the distribution network 124 in accordance with a time signal from the STC 114 and the output time stamps of the TS packets. The buffer 120 may comprise random access memory (RAM) having multiple ports for access by the preliminary output time stamper 116, the output time stamp adjuster 118, and the output interface 122. Alternatively, the buffer 120 may have only a single interface that is shared among the preliminary output time stamper 116, the output time stamp adjuster 118, and the output interface 122.

Figure 6:
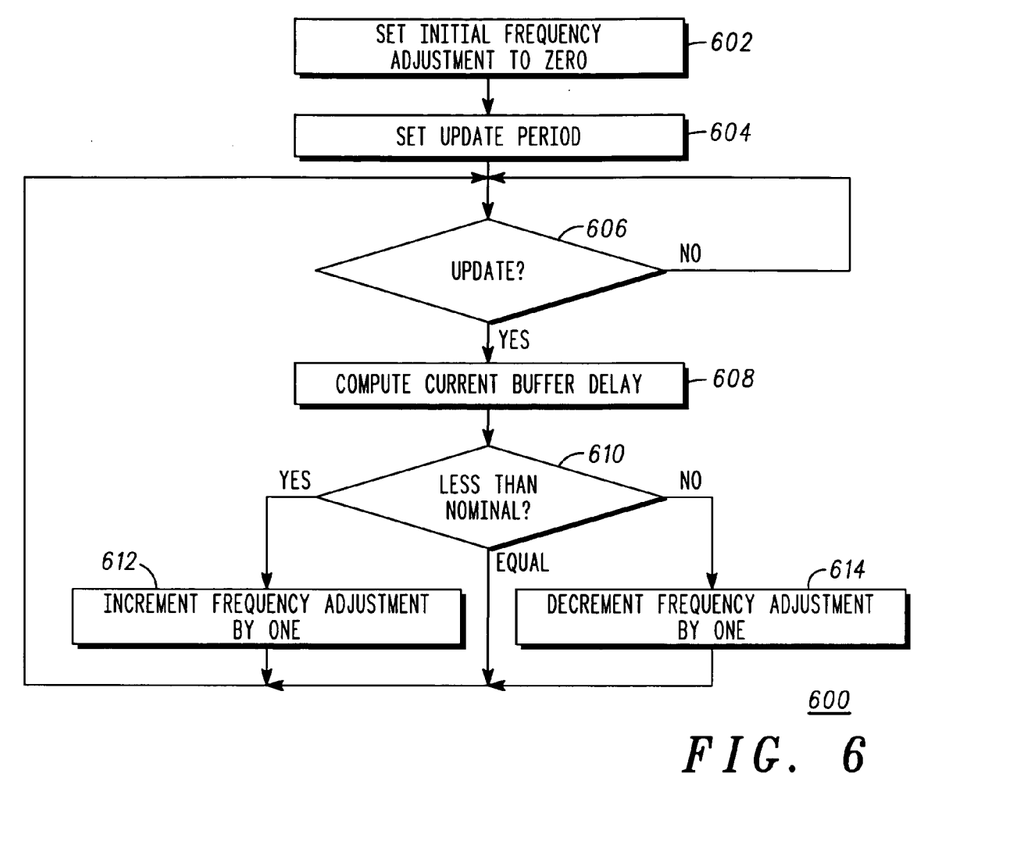
FIG. 6 is a flow diagram depicting an exemplary embodiment of a method for compensating for clock skew in accordance with the invention.

Operation of the output time stamp adjuster 118 may be more thoroughly understood with reference to the following description. For the first (initial) PCR-packet in the transport stream, the correct output time stamp is the preliminary output time stamp, since there is no previous PCR-packet with which reference may be made (e.g., there is a PCR discontinuity in the transport stream or the buffer 120 is empty). The second PCR-packet has a dejittered (adjusted) output time stamp given by:

$$\text{Dejitter\_output\_time\_stamp (2nd } PCR\_\text{pkt}) = \text{Dejitter\_output\_time\_stamp (1st } PCR\_\text{pkt}) + PCR\_\text{value (2nd } PCR\_\text{pkt}) - PCR\_\text{value (1st } PCR\_\text{pkt}) + \text{clock\_adjust (2nd } PCR\_\text{pkt)} \quad [2],$$

where Dejitter_output_time_stamp (x) represents a dejittered output time stamp for the xth PCR-packet, PCR_value (x) represents the PCR value of the xth PCR-packet, and clock_adjust (x) represents a clock adjustment to the xth PCR-packet. The last term in Equation [2] represents an adjustment needed to account for the deviation in clock frequencies between the transmitter sources (e.g., the live feed 108 and the VOD server 106) and the STC 114 of the transport stream processor 102. A clock adjustment process is described below with respect to FIG. 6.

Once the dejittered output time stamp for the second PCR-packet has been determined, all the TS packets in-between the first and second PCR-packets must have their output time stamps adjusted so that they are uniformly spaced between the two PCR-packets. In one embodiment, uniform spacing is achieved by starting with the first PCR-packet and adjusting the output time stamp of the TS packet immediately following the first PCR-packet to a value equal to the dejittered time stamp of the first PCR-packet plus an increment. The increment is calculated as:

(difference in PCR value between first and second PCR-packets)/(total number of packets between first and second PCR-packets+1). [3]

Each successive TS packet will have an output time stamp that equals the previous TS packet's output time stamp plus the increment. This adjustment continues until the second PCR-packet is reached. The second PCR-packet is not be adjusted, since it already has the correct dejittered output time stamp.

Alternatively, uniform spacing may be achieved by starting from the second PCR-packet and working backwards, in which case the TS packet immediately preceding the second PCR-packet is given an output time stamp value that has been decremented from the second PCR-packet's dejittered output time stamp. The amount of the decrement is computed using Equation [3] set forth above. Working backwards, each preceding TS packet has an output time stamp value that is decremented by the fixed amount until the first PCR-packet is reached.

Using either uniform spacing method, the newly calculated output time stamps are the dejittered time stamps for the packets in-between the two PCR-packets. For subsequent PCR-packets, dejittered output time stamps may be calculated recursively in accordance with the following:

$$\text{Dejitter\_output\_time\_stamp}(PCR\_\text{pkt}[n+1]) = \text{Dejitter\_output\_time\_stamp }(PCR\_\text{pkt}[n]) + PCR\_\text{value }(PCR\_\text{pkt}[n+1]) - PCR\_\text{value}(PCR\_\text{pkt}[n]) + \text{clock\_adjust}(PCR\_\text{pkt}[n+1]). \quad [4]$$

The TS packets in-between PCR-packet[n] and PCR-packet[n+1] include dejittered output time stamps computed using either of the uniform spacing procedures described above. In this manner, the invention provides a dejittered transport stream to the user terminals 126. Since the invention does not attempt to measure the input bit-rate of the transport stream, the invention may be used to perform dejittering of variable bit-rate transport streams, as well as constant bit-rate transport streams.

The time delay in the buffer 120 for the PCR-packet[n] must be sufficiently long so that the TS packets following PCR-packet[n] are not distributed to the user terminals 126 before PCR-packet[n+1] arrives. Designating the arrival time at the receiving end of PCR-packet[n+1] as Arrival_time (PCR_pkt[n+1]), the buffer delay requirement can be written as:

$$\text{Dejitter\_output\_time\_stamp}(PCR\text{ pkt}[n]) > \text{Arrival\_time}(PCR\_\text{pkt}[n+1]) \quad [5].$$

The arrival time of a TS packet is equal to the transmission time of that TS packet plus a variable network delay that accounts for both the time it takes for the TS packet to travel through the feed network 104 and the assembly of a group of TS packets to form a single Ethernet frame at the transmission end. In other words the arrival time can be expressed as:

$$\text{Arrival\_time}(PCR\_\text{pkt}[n+1]) = \text{Transmit\_time}(PCR\_\text{pkt}[n+1]) + \text{Network\_delay}(PCR\_\text{pkt}[n+1]) \quad [6],$$

where Transmit_time(x) represents the transmission time of the xth PCR-packet and Network_delay(x) represents the network delay of the xth PCR-packet.

The transmission time of each PCR-packet is related to the one before it by the PCR values:

$$\text{Transmit\_time}(PCR\_\text{pkt}[n+1]) = \text{Transmit\_time}(PCR\_\text{pkt}[n]) + PCR\_\text{value}(PCR\_\text{pkt}[n+1]) - PCR\_\text{value}(PCR\_\text{pkt}[n]) + \text{clock\_skew}(PCR\_\text{pkt}[n+1]) \quad [7],$$

where clock_skew(x) represents the clock skew experienced by the xth PCR-packet. In a similar manner, the arrival times are related to each other as:

$$\text{Arrival\_time}(PCR\_\text{pkt}[n+1]) = \text{Arrival\_time}(PCR\_\text{pkt}[n]) + \text{Network\_delay}(PCR\_\text{pkt}[n+1]) - \text{Net-}$$

work_delay($PCR\_pkt[n]$)+$PCR\_value$($PCR\_pkt$
[$n$+1])−$PCR\_value$($PCR\_pkt[n]$)+clock_skew
($PCR\_pkt[n+1]$)  [8].

Using equations [4] and [8] recursively, the buffer delay requirement for each PCR-packet[n] as expressed by the inequality in [5] can now be re-written as:

Dejitter_output_time_stamp($PCR\_pkt[1]$)+$PCR\_value$
($PCR\_pkt[n]$)−$PCR\_value$($PCR\_pkt[1]$)+Σclock-
_adjust($PCR\_pkt[i]$)>Arrival_time($PCR\_pkt$
[1])+Network_delay($PCR\_pkt[n+1]$)−
Network_delay($PCR\_pkt[1]$)+$PCR\_value$
($PCR\_pkt[n+1]$)−$PCR\_value$($PCR\_pkt[1]$)+
Σclock_skew($PCR\_pkt[i]$)  [9], where i ranges between 1 and n.

Assuming that the clock_adjust at the receiving end cancels out the clock skew from the transmission end, the buffer delay requirement for each PCR-packet becomes:

Dejitter_output_time_stamp($PCR\_pkt[1]$)−Arrival-
_time($PCR\_pkt[1]$)>Network_delay($PCR\_pkt$
[$n$+1])−Network_delay($PCR\_pkt[n]$)+$PCR\_value$
($PCR\_pkt[n+1]$)−$PCR\_value$($PCR\_pkt[n]$)  [10]

In order for the inequality in [10] to be satisfied for every n, the first dejittered output time stamp should be set to be sufficiently large so that the left hand side of [10] always exceeds the maximum possible value for the right side. For the two terms relating to network delay, the maximum value is reached when network_delay(PCR_pkt[n+1]) equals the maximum possible delay and network_delay(PCR_pkt[n]) equals the minimum possible delay. The difference between the minimum and maximum possible delays is referred to herein as the maximum jitter.

With regards to the last two terms, the greatest distance between two successive PCR values shall be called the maximum PCR interval. For an MPEG2 transport stream, this maximum interval is 0.1 seconds. Therefore, the requirement in [10] for each PCR-pkt[n] will be satisfied if:

Dejitter_output_time_stamp($PCR\_pkt[1]$)−Arrival-
_time($PCR\-pkt[1]$)>Max_jitter+Max_
PCR_interval  [11], where Max_jitter represents the maximum jitter and Max_PCR_interval represents the maximum interval between PCR-packets (e.g., 0.1 seconds in MPEG-2). This can be achieved by setting the initial (nominal) buffer delay in the preliminary output time stamper 116 to be sufficiently large.

On the other hand, the buffer delay typically has an upper bound due to memory size limitations and system performance requirements. For each PCR-packet, an upper limit may be expressed as Dejitter_output_time_stamp($PCR\_pkt[n]$)−Arrival-
_time($PCR\_pkt[n]$)≦MAX_DELAY  [12], where MAX_DELAY represents an upper bound for the buffer delay. Again, using [4] and [8] recursively, [12] becomes:

Dejitter_output_time_stamp($PCR\_pkt[1]$)+Σclock-
_adjust(PCR_pkt[$i$])−Arrival_time($PCR\_pkt$
[1])−Network_delay($PCR\_pkt[n]$)+Network_de-
lay($PCR\_pkt[1]$)−Σclock_skew($PCR\_pkt[1]$)
≦MAX_DELAY.  [13], where i and l each range between 1 and n. If the clock adjustment is made to cancel the clock skew, then [13] can be simplified as:

Dejitter_output_time_stamp($PCR\_pkt[1]$)−Arrival-
_time($PCR\_pkt[1]$)≦MAX_DELAY+Net-
work_delay($PCR\_pkt[n]$)−Network_delay($PCR$
_pkt[1])  [14].

The strictest condition is established by finding the smallest value for the right hand side of [14]. This occurs when network_delay(PCR pkt[n]) is minimized and network delay (PCR_pkt[1]) is maximized. Thus, to satisfy the upper bound on buffer delay for every PCR-packet, it is sufficient to require that:

Dejitter_output_time_stamp($PCR\_pkt[1]$)−Arrival-
_time($PCR\_pkt[1]$)≦MAX_DELAY−Max_jitter  [15].

Combining the requirements in [11] and [15] leads to the conclusion that the initial buffer delay must satisfy the lower and upper bounds of:

Max_jitter+Max_
PCR_interval≦Dejitter_output_time_stamp
($PCR\_pkt[1]$)−Arrival_time($PCR\_pkt[1]$)
≦MAX_DELAY−Max_jitter  [16].

Therefore, MAX_DELAY is greater than or equal to 2*Max_jitter+Max_PCR_interval. For a typical system, Max_jitter=0.05 seconds and Max_PCR_interval=0.1 sec. Thus MAX_DELAY is greater than or equal to 0.2 seconds. For a system with a total throughput bitrate of 960 Mbps, the buffer memory requirement is 0.2×960 Mbps=192 Mbits=23 Mbytes. However, this ignores any clock skew between the transmitter sources and the transport stream processor 102 or assumes that the skew can be perfectly compensated for by the transport stream processor 102. The clock adjustment process and its impact on the buffer memory requirement is discussed below.

Figure 3:
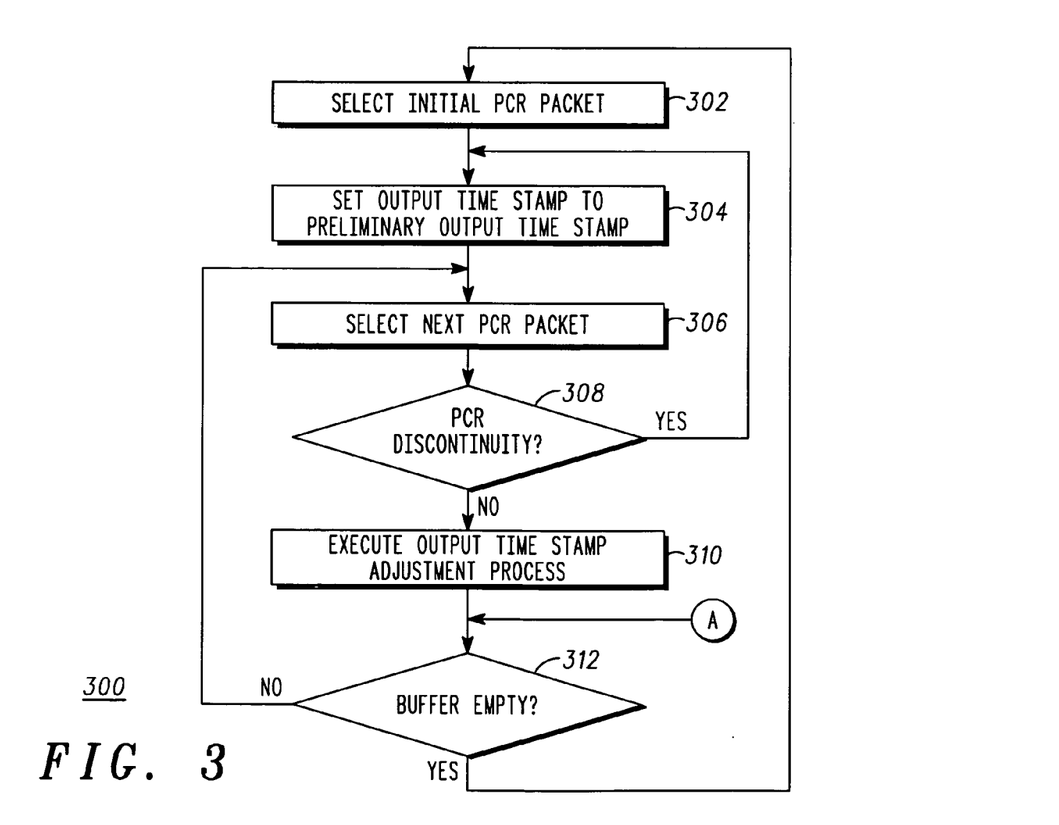
FIG. 3 is a flow diagram depicting an exemplary embodiment of a method for dejittering transport stream packets in accordance with one or more aspects of the invention.

The process performed by the transport stream processor 102 to dejitter the TS packets is now described with respect to the following flow diagrams. FIG. 3 is a flow diagram depicting an exemplary embodiment of a method 300 for dejittering transport stream packets in accordance with one or more aspects of the invention. The method 300 begins at step 302, where an initial PCR-packet is selected from the buffer. At step 304, the output time stamp of the initial PCR-packet is set to the preliminary output time stamp. That is, the output time stamp for the initial PCR-packet is left unchanged. At step 306, a next PCR-packet is selected from the buffer. At step 308, a determination is made as to whether a PCR discontinuity bit has been set in the transport stream. If not, the method 300 proceeds to step 310, where an output time stamp adjustment process is executed. Exemplary embodiments of such processes are described below with respect to FIGS. 4 and 5.

If a PCR discontinuity bit has been set, the method 300 proceeds from step 308 to step 304, where the output time stamp of the next PCR-packet is set to the preliminary output time stamp for that packet (i.e., the output time stamp is left unchanged). The output time stamp adjustment process may not effectively reduce or eliminate jitter if the PCR values are not continuous. For example, a discontinuity may appear whenever the video makes a transition from a normal mode to a trick-play mode (e.g., fast-forward, rewind) and vice versa. At step 312, a determination is made as to whether the buffer is empty. If not, the method 300 proceeds to step 306, where another PCR-packet is selected. Otherwise, the method 300 proceeds to step 302, where an initial PCR packet is selected.

Notably, in a pause mode, the interval between PCR-packets may be arbitrarily long. That is, no TS packets may be received for an arbitrarily long period of time. Upon exiting the pause mode, the first PCR value may not bear any relationship to the previous PCR value, which was received before the pause. In such cases, the re-started (i.e., un-paused) transport stream is treated as a new transport stream. In general, whenever the buffer 120 is empty, the next packet that arrives is deemed to be the start of a new transport stream.

Figure 4:
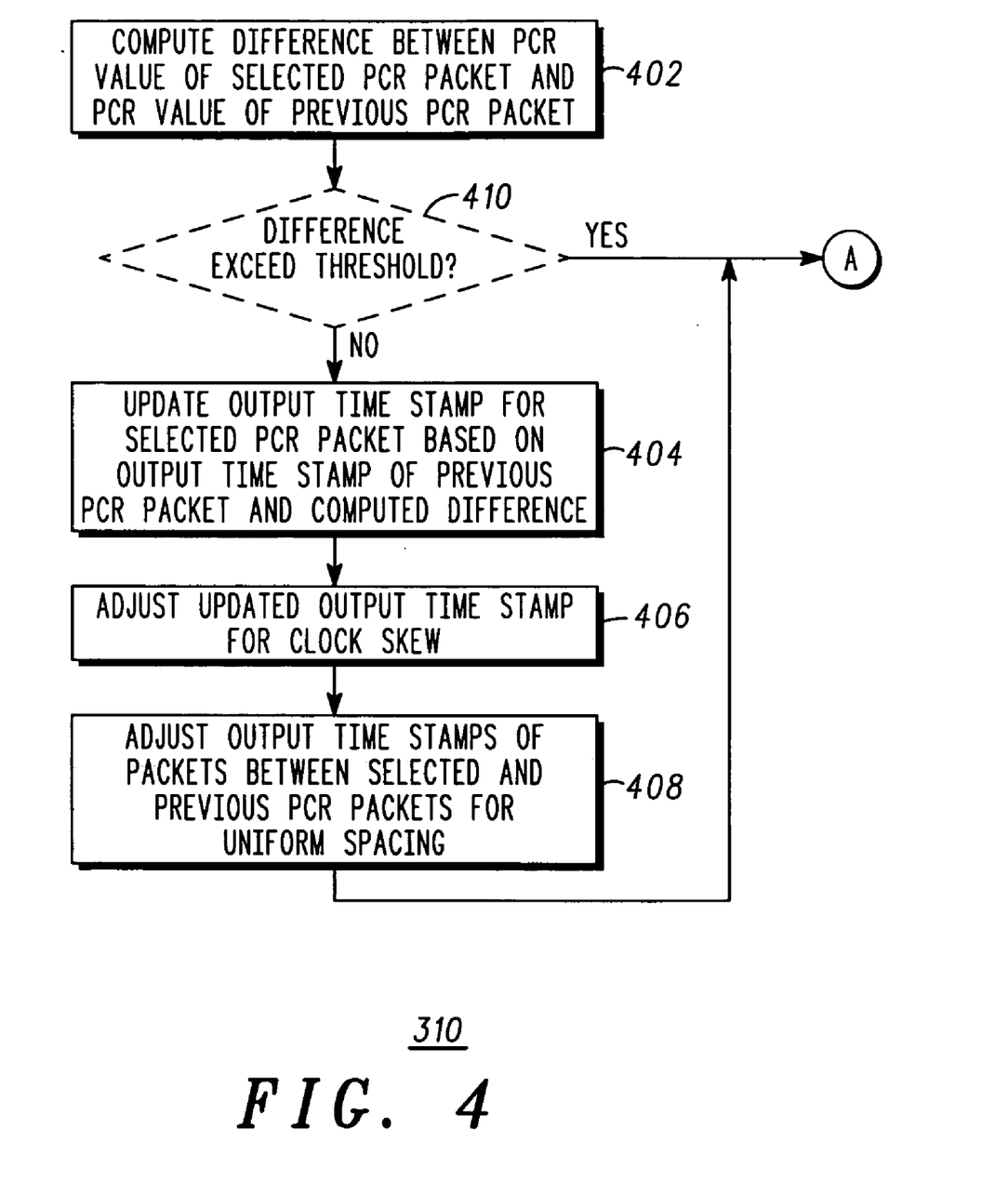
FIG. 4 is a flow diagram depicting an exemplary embodiment of a method for adjusting an output time stamp in accordance with the invention.

FIG. 4 is a flow diagram depicting an exemplary embodiment of a method 400 for adjusting an output time stamp in accordance with the invention. The method 400 may be performed in step 310 of the dejittering method 300 described above with respect to FIG. 3. Aspects of the method 400 may be understood with simultaneous reference to FIG. 3 and the operational description of the output time stamp adjuster 118 of FIG. 1. The method 400 begins at step 402, where a difference between the PCR value of the selected PCR-packet and the PCR value of the previous PCR-packet is computed. At step 404, the output time stamp for the selected PCR-packet is updated based on the output time stamp of the previous PCR-packet and the difference computed at step 402 (e.g., equation [4]). At step 406, the updated output time stamp for the selected PCR-packet is adjusted for clock skew. An exemplary process of adjusting output time stamps for clock skew is described below with respect to FIG. 6. At step 408, the output time stamps of TS packets between the selected PCR-packet and the previous PCR-packet are adjusted for uniform spacing. From step 408, the method 400 proceeds to step 312 of the method 300.

In some cases, the transport stream may be in a trick-play mode (e.g., fast-forward or rewind). In both fast-forward and rewind modes, only the I-frames of the encoded video are transmitted. The only PCR-packets are those attached to the beginning of the I-frames. Since the size of each I-frame can be of variable duration, the interval between two consecutive PCR-packets may vary. Often, the interval will exceed the MPEG-2 system standard of 0.1 seconds. In one embodiment, to handle the fast-forward and rewind trick play modes, the buffer 120 may be designed to accommodate the largest possible PCR interval. For example, in a VOD system, the maximum PCR-packet interval may be as large as 0.4 seconds. Thus, the MAX_DELAY=0.825 seconds and the memory requirement increases to 792,000,000 bits (or 94.4 megabytes).

In another embodiment, the output time stamp adjustment process may be suspended when the interval between two PCR-packets exceeds a threshold value. In one embodiment, the threshold value is the MPEG-2 system standard value of 0.1 seconds. Thus, after step 402, the method 400 may proceed to optional step 410, where a determination is made as to whether the computed difference exceeds a threshold value. If so, the method 400 bypasses the output time stamp adjustment process by returning to step 312 of the method 300. Otherwise, the output time stamp adjustment process (steps 404-408) is performed. In yet another embodiment, the output time stamp adjustment process may be suspended when the previous PCR-packet is no longer in the buffer. This can be checked by comparing the output time stamp of the previous PCR-packet (which may be stored in a register) with the current time as indicated by the STC 114.

In yet another embodiment, the output time stamp adjustment process may be implemented differently from method 400 whenever the previous PCR-packet is no longer in the buffer. Notably, a dejittered output time stamp may be produced for each PCR-packet, but is only used if the dejittered output time stamp is greater than the current time as measured by the STC 114. In addition, only those TS packets remaining in the buffer 120 will have their output time stamps recomputed. The process of re-computing the output time stamps starts from the most recently received PCR-packet (i.e., the second PCR-packet in this exceedingly long PCR interval) and work backwards. The output time stamp interval amongst the non-PCR packets remaining in the buffer 120 is set to be:

{Dejitter_output_time_stamp(PCR_pkt[$n$])−Arrival_time(PCR_pkt[$n$])}/{number of non-PCR packets remaining in the buffer+1}

Thus, the TS packet immediately preceding the PCR-packet includes an output time stamp equal to the PCR-packet's dejittered output time stamp minus the above time interval, and each TS packet preceding will receive an output time stamp that has been decremented by the above time interval.

Figure 5:
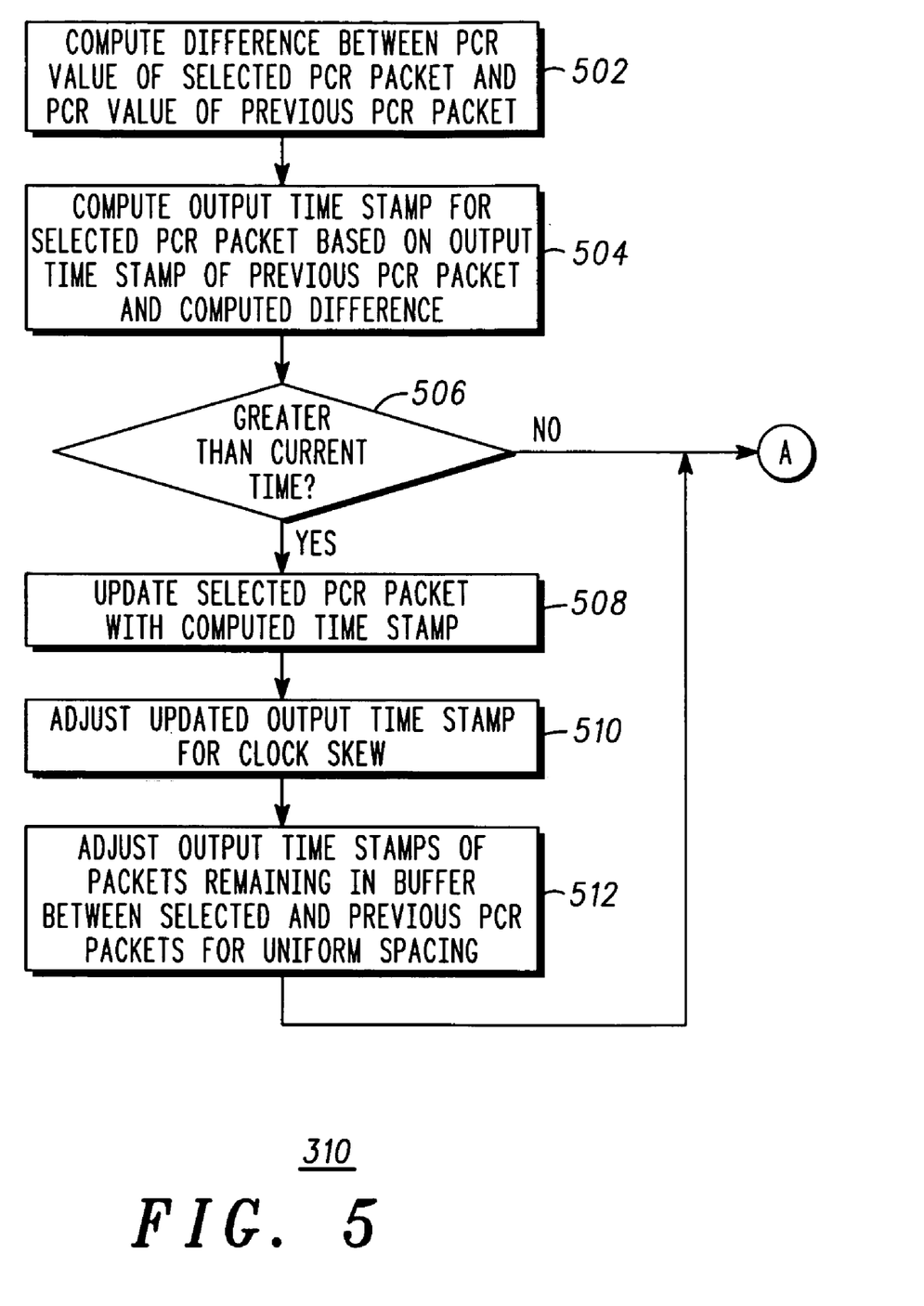
FIG. 5 is a flow diagram depicting another exemplary embodiment of a method for adjusting an output time stamp in accordance with the invention.

Notably, FIG. 5 is a flow diagram depicting another exemplary embodiment of a method 500 for adjusting an output time stamp in accordance with the invention. At the execution of step 310 of the dejittering method 300, if the previous PCR-packet is no longer in the buffer, the method 500 may be performed in step 310 of the dejittering method 300 described above with respect to FIG. 3. Aspects of the method 500 may be understood with simultaneous reference to FIG. 3 and the operational description of the output time stamp adjuster 118 of FIG. 1.

The method 500 begins at step 502, where a difference between the PCR value of the selected PCR-packet and the PCR value of the previous PCR-packet is computed. At step 504, the output time stamp for the selected PCR-packet is computed based on the output time stamp of the previous PCR-packet and the difference computed at step 502 (e.g., equation [4]). At step 506, a determination is made as to whether the computed output time stamp is greater than the current time. If so, the method 500 proceeds to step 508. At step 508, the selected PCR-packet is updated with the computed output time stamp. At step 510, the updated output time stamp for the selected PCR-packet is adjusted for clock skew. An exemplary process of adjusting output time stamps for clock skew is described below with respect to FIG. 6. At step 512, the output time stamps of TS packets between the selected PCR-packet and the previous PCR-packet are adjusted for uniform spacing. From step 512, the method 500 proceeds to step 312 of the dejittering method 300.

In developing the requirements for the initial buffer delay as in equations [11] and [15], the assumption was made that any clock skew due to the clock frequency variations between the transmission source and the transport stream processor 102 can be compensated. Without such compensation, the buffer delay will drift lower when the cumulative clock skew ($\Sigma$clock_skew(PCR_pkt[i])) is positive, and the buffer delay will lengthen when the overall clock skew is negative. However, since the network delay for each TS packet is unknown to the transport stream processor 102, the transmission time and hence the term clock_skew(PCR_pkt[n]) cannot be determined reliably. As a result, an adjustment term clock_adjust (PCR_pkt[n]) cannot be calculated reliably such that it will perfectly cancel out the clock skew for each TS packet. Even though an exact packet-by-packet compensation cannot be made, a gradual adjustment that over the long term compensates for the accumulative clock skew can still be used to prevent the buffer delay from drifting too far as to violate the conditions set forth in equations [5] and [12].

Notably, when the buffer delay for PCR-pkt[n] falls below the initial nominal delay, that is:

Dejitter_output_time_stamp(*PCR*_pkt[$n$])−Arrival_time(*PCR*_pkt[$n$])<Dejitter_output_time_stamp(*PCR*_pkt[1])−Arrival_time(*PCR*_pkt[1])   [16], a positive adjustment to the output time stamp, which corresponds to slowing down the PCR clock, will lengthen the delay. A negative adjustment, which corresponds to speeding up the PCR clock, is called for when the buffer delay exceeds the nominal. However, for the dejittered output time stamps to comply with MPEG-2 limits, any adjustment must stay within 0.075 Hz per second for any 27 Mhz PCR clock. For each second, the PCR clock frequency can be adjusted by at most 2.77 parts per billion.

In one embodiment of the invention, to keep track of how much frequency adjustment is allowed, a cumulative variable freq_adjust is updated periodically. During each update, if the current buffer delay is short, then freq_adjust is incremented by one, and if the current buffer delay is long, then freq_adjust is decremented by one. If the update period is chosen to be one second each, then every one unit in freq_adjust corresponds to 2.77 parts per billion. The adjustment to a dejittered output time stamp is derived from freq_adjust by:

$$\text{Clock\_adjust}(PCR\_pkt[n]) = \{PCR\_value(PCR\_pkt[n]) - PCR\_value(PCR\_pkt[n-1])\} * \text{freq\_adjust} * (2.77 \times 10^{-9}) \quad [17].$$

The value produced by equation [17] may be substituted into equation [4] described above to adjust the output time stamp. Since this adjustment is very gradual, a designed-for worst case scenario of clock frequency variation of 25 parts-per-million between the transmitter source and the transport stream processor 102, for example, will take $(25 \times 10^{-6}/2.77 \times 10^{-9})$ seconds or 2.5 hours for the transport stream processor 102 to fully adjust to the transmitters source's frequency. Notably, the MPEG-2 standard requires a clock frequency variation of no worse than 30 parts-per-million. The exemplary worst case scenario of 25 parts-per-million is derived from the MPEG-2 requirement minus a maximum clock jitter of 5 parts-per-million.

FIG. 6 is a flow diagram depicting an exemplary embodiment of a method 600 for compensating for clock skew in accordance with the invention. The method 600 begins at step 602, where a frequency adjustment variable is set to zero. At step 604, an update period is established (e.g., once every second). At step 606, a determination is made as to whether the update period has expired. If not, the method 600 cycles and waits until the update period expires. At step 608, a current buffer delay is computed for the current PCR-packet. The current buffer delay for the nth PCR-packet may be computed from:

$$\text{Dejitter\_output\_time\_stamp}(PCR\_pkt[n]) - \text{Arrival\_time}(PCR\_pkt[n])$$

At step 610, a determination is made as to whether the current buffer delay is less than the nominal buffer delay. If so, the method 600 proceeds to step 612, where the frequency adjustment variable is incremented by one. The method 600 then returns to step 606. If the current buffer delay is greater than the nominal buffer delay, the method 600 proceeds to step 614, where the frequency adjustment variable is decremented by one. The method 600 then returns to step 606. If the current buffer delay is equal to the nominal buffer delay, the method 600 returns to step 606 without changing the frequency adjustment variable. The output time stamps for the PCR-packets may be adjusted to compensate for clock skew using the frequency adjustment variable as described above with respect to equation [17].

Before full clock adjustment is achieved, clock_adjust (PCR pkt[n]) will always be smaller than clock_skew(PCR_pkt[n]) for the case where the transmitter source clock is running slower than the STC 114. At the PCR_pkt[n], the cumulative difference $\Sigma\text{clock\_adjust}(PCR\_pkt[i]) - \Sigma\text{clock\_skew}(PCR\_pkt[i])$ is negative, which will cause the buffer delay to be shorter than the initial buffer delay used by the preliminary output time stamper 116. This can be seen by applying [4] and [8] recursively so that the buffer condition at PCR-packet[n] can be related back to the initial buffer delay as:

$$\text{Dejitter\_output\_time\_stamp}(PCR\_pkt[n]) - \text{Arrival\_time}(PCR\_pkt[n]) = \text{Dejitter\_output\_time\_stamp}(PCR\_pkt[1]) - \text{Arrival\_time}(PCR\_pkt[1]) + \{\Sigma\text{clock\_adjust}(PCR\_pkt[i]) - \Sigma\text{clock\_skew}(PCR\_pkt[i])\} - \text{Network\_delay}(PCR\_pkt[n]) + \text{Network\_delay}(PCR\_pkt[1]) \quad [18].$$

From [18] above, an expression may be derived for the dejittered output time stamp of PCR-packet[n]. Applying that expression to the buffer condition [5] yields:

$$\text{Arrival\_time}(PCR\_pkt[n]) + \text{Dejitter\_output\_time\_stamp}(PCR\_pkt[1]) - \text{Arrival\_time}(PCR\_pkt[1]) + \{\Sigma\text{clock\_adjust}(PCR\_pkt[i]) - \Sigma\text{clock\_skew}(PCR\_pkt[i])\} - \text{Network\_delay}(PCR\_pkt[n]) + \text{Network\_delay}(PCR\_pkt[1]) > \text{Arrival\_time}(PCR\_pkt[n+1]) \quad [19].$$

The above condition on the initial buffer delay is more demanding than the one previously derived in [11], as the alternate condition states:

$$\text{Dejitter\_output\_time\_stamp}(PCR\_pkt[1]) - \text{Arrival\_time}(PCR\_pkt[1]) > \text{Arrival\_time}(PCR\_pkt[n+1]) - \text{Arrival\_time}(PCR\_pkt[n]) - \{\Sigma\text{clock\_adjust}(PCR\_pkt[i]) - \Sigma\text{clock\_skew}(PCR\_pkt[i])\} + \text{Network\_delay}(PCR\_pkt[n]) - \text{Network\_delay}(PCR\_pkt[1]) \quad [20].$$

From equation [8], the difference in arrival time can be replaced, and as a result the alternate initial buffer condition can be restated as:

$$\text{Dejitter\_output\_time\_stamp}(PCR\_pkt[1]) - \text{Arrival\_time}(PCR\_pkt[1]) > PCR\_value(PCR\_pkt[n+1]) - PCR\_value(PCR\_pkt[n]) + \text{clock\_skew}(PCR\_pkt[n+1]) - \{\Sigma\text{clock\_adjust}(PCR\_pkt[i]) - \Sigma\text{clock\_skew}(PCR\_pkt[i])\} + \text{Network\_delay}(PCR\_pkt[n+1]) - \text{Network\_delay}(PCR\_pkt[1]) \quad [21].$$

The terms relating to PCR_values reach their worst case at Max_PCR_interval; similarly the network delay related terms reach their worst case when Network_delay(PCR_pkt[n+1]) is maximum and Network_delay(PCR_pkt[1]) is minimum. This can be expressed as Max_jitter. The single clock skew term has a maximum value of 0.000025×Max_PCR_interval, which corresponds to a maximum clock frequency deviation of 25 parts per million and a maximum interval between PCR-packet[n] and PCR-packet[n+1]. Therefore:

$$\text{Dejitter\_output\_time\_stamp}(PCR\_pkt[1]) - \text{Arrival\_time}(PCR\_pkt[1]) > 1.000025 * \text{Max\_PCR\_interval} + \text{Max\_jitter} - \{\Sigma\text{clock\_adjust}(PCR\_pkt[i]) - \Sigma\text{clock\_skew}(PCR\_pkt[i])\} \quad [22].$$

As discussed above, the term $\{\Sigma\text{clock\_adjust}(PCR\_pkt[i]) - \Sigma\text{clock\_skew}(PCR\_pkt[i])\}$ is negative. With the worst case frequency deviation of 25 parts per million (i.e. the transmit clock is 675 Hz slower than the STC 114), it takes 2.5 hours for the transport stream processor 102 to compensate for its clock, so the most negative cumulative effect is reached at 2.5 hours after the initialization of the transport stream. The maximum negative value can be computed: 2.5 hours× 0.000025/2. (The division by two is necessary, since during the entire 2.5 hour period the frequency difference between the two ends is not fixed at 25 ppm, but rather the transport stream processor 102 is attempting to compensate for the clock to match the transmitter).

Given this worst case value, the initial buffer delay is at least:

$$\text{Dejitter\_output\_time\_stamp}(PCR\_pkt[1]) - \text{Arrival\_time}(PCR\_pkt[1]) > \text{Max\_PCR\_interval} + \text{Max\_jitter} + 0.1125 \text{ second} \quad [23]$$

Taking the opposite worst case scenario, where the transmit clock is faster than the STC 114 by 25 ppm (i.e. 675 Hz faster). This affects the upper limit on the buffer delay. The left hand side of equation [18] must be bound by a maximum as shown in [12]. This imposes the condition on the initial delay as:

Dejitter_output_time_stamp(PCR_pkt[1])−Arrival_time(PCR_pkt[1])+{Σclock_adjust(PCR_pkt[i])−Σclock_skew(PCR_pkt[i])}+Network_delay(PCR_pkt[n])−Network_delay(PCR_pkt[1])<MAX_DELAY    [24].

Replacing the network delays with their worst case values:

Dejitter_output_time_stamp(PCR_pkt[1])−Arrival_time(PCR_pkt[1])+{Σclock_adjust(PCR_pkt[i])−Σclock_skew(PCR_pkt[i])}<MAX_DELAY−Max_jitter    [25].

Through a similar analysis as before, the cumulative effect due to the clock_skew and clock_adjust has a maximum (positive) value at the end of 2.5 hours, which is +0.1125 seconds. Therefore, the initial buffer delay is now constrained by:

Dejitter_output_time_stamp(PCR_pkt[1])−Arrival_time(PCR_pkt[1])<MAX_DELAY−Max_jitter−0.1125 seconds    [26].

Combining this with the requirement in [23] yields the following:

1.000025*Max_PCR_interval+Max_jitter+0.1125 seconds<initial delay<MAX_DELAY−Max_jitter−0.1125 sec    [27]

Therefore the MAX_DELAY must be greater than 1.000025*Max_PCR_interval+2 times Max_jitter+0.225 seconds, which yields the buffer memory design requirement. For a typical case of Max_PCR_interval=0.1 seconds and Max_jitter of 0.05 seconds, the MAX_DELAY is 0.4250025 seconds, which at a throughput bitrate from the network 104 of 960 Mbps, the buffer memory 120 needs to be 408,002,400 bits (or 48.7 Mbytes). Once the MAX_DELAY is set, an initial delay may be chosen that satisfies both inequalities of equation [27].

Figure 7:
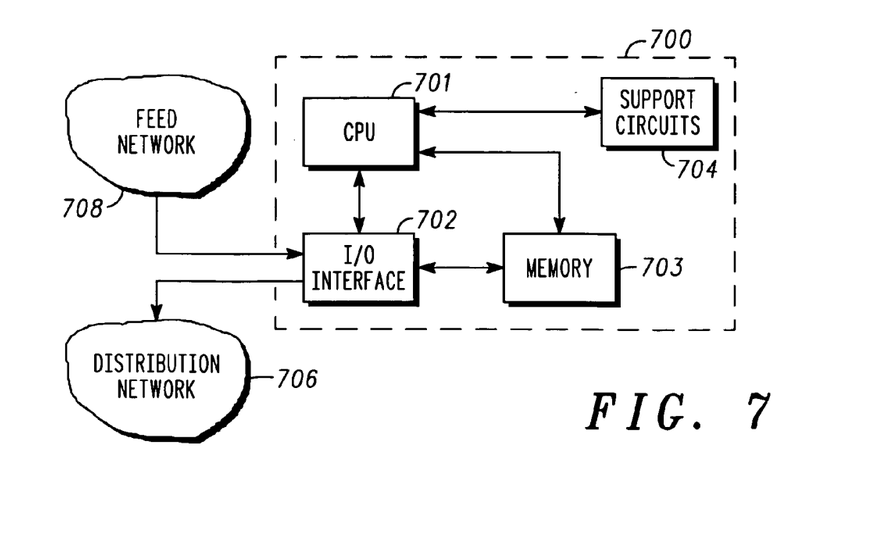
FIG. 7 is a block diagram depicting an exemplary embodiment of a computer suitable for implementing embodiments of the invention described herein.

In another embodiment, the transport stream processor 102 of FIG. 1 is implemented using a computer. Notably, FIG. 7 is a block diagram depicting an exemplary embodiment of a computer 700 suitable for implementing embodiments of the invention described herein. The computer 700 comprises a central processing unit (CPU) 701, a memory 703, various support circuits 704, and an I/O interface 702. The CPU 701 may be any type of microprocessor known in the art. The support circuits 704 for the CPU 701 include conventional cache, power supplies, clock circuits, data registers, I/O interfaces, and the like. The I/O interface 702 may be directly coupled to the memory 703 or coupled through the CPU 701. The I/O interface 702 is coupled to the feed network 104 for receiving frames carrying groups of TS packets, and the distribution network 124 for supplying TS packets to the user terminals 126.

The memory 703 may store all or portions of one or more programs and/or data to implement the transport stream processor 102, as well as the various processes and methods described herein. Although one or more aspects of the invention are disclosed as being implemented as a computer executing a software program, those skilled in the art will appreciate that the invention may be implemented in hardware, software, or a combination of hardware and software. Such implementations may include a number of processors independently executing various programs and dedicated hardware, such as ASICs.

While the foregoing is directed to illustrative embodiments of the present invention, other and further embodiments of the invention may be devised without departing from the basic scope thereof, and the scope thereof is determined by the claims that follow.

The invention claimed is:

1. A method of processing transport stream packets received from a network for distribution to user terminals, comprising, in at least one processor:
    extracting groups of said transport stream packets from data units transmitted over said network;
    appending an arrival time stamp to each of said groups;
    appending a preliminary output time stamp to each of said transport stream packets, the preliminary output time stamp being equal to the arrival time stamp plus a fixed initial nominal buffer delay;
    identifying a pair of clock reference packets in said transport stream packets, said pair of clock reference packets including a first clock reference packet having an output time stamp and a second clock reference packet;
    computing a difference between a time value of said second clock reference packet and a time value of said first clock reference packet;
    calculating an output time stamp for said second clock reference packet in response to said output time stamp of said first clock reference packet and said difference;
    adjusting each output time stamp of each transport stream packet between said first clock reference packet and said second clock reference packet such that there is uniform time spacing between each said transport stream packet; and
    reverting to said preliminary output time stamp associated with said second clock reference packet in response to said output time stamp being greater than a current time value.

2. The method of claim 1, further comprising:
    calculating an increment value in response to at least one transport stream packet of said transport stream packets between said first clock reference packet and said second clock reference packet; and
    computing an output time stamp for each said at least one transport stream packet in response to said increment value.

3. The method of claim 1, further comprising:
    repeating said steps of identifying, computing, calculating, and adjusting for one or more additional pairs of clock reference packets.

4. A method of processing transport stream packets received from a network for distribution to user terminals, comprising, in at least one processor:
    identifying a pair of clock reference packets in said transport stream packets, said pair of clock reference packets including a first clock reference packet having an output time stamp and a second clock reference packet;
    computing a difference between a time value of said second clock reference packet and a time value of said first clock reference packet;
    calculating an output time stamp for said second clock reference packet in response to said output time stamp of said first clock reference packet and said difference;
    adjusting each output time stamp of each transport stream packet between said first clock reference packet and said second clock reference packet such that there is uniform time spacing between each said transport stream packet;
    calculating a clock adjustment value for said output time stamp of said second clock reference packet; and adjusting said output time stamp for said second clock reference packet in response to said clock adjustment value;

wherein said step of calculating said clock adjustment value comprises:
determining a frequency adjustment value;
computing said clock adjustment value in response to said difference and said frequency adjustment value;

wherein said step of determining a frequency adjustment value comprises:
computing a second difference between values of two clock reference packets in said transport stream packets;
incrementing said frequency adjustment value in response to said second difference being less than a nominal difference; and
decrementing said frequency adjustment value in response to said second difference being more than a nominal difference.

5. The method of claim 1, further comprising:
detecting a clock reference discontinuity in said transport stream packets;
bypassing said computing step, said calculating step, and said adjusting step for said pair of clock reference packets; and
repeating said steps of identifying, computing, calculating, and adjusting for another pair of clock reference packets.

6. The method of claim 1, further comprising:
bypassing said computing step, said calculating step, and said adjusting step for said pair of clock reference packets in response to said difference exceeding a threshold; and
repeating said steps of identifying, computing, calculating, and adjusting for another pair of clock reference packets.

7. An apparatus for processing transport stream packets received from a network for distribution to user terminals, comprising:
a buffer for storing said transport stream packets;
an output time stamp adjuster, coupled to said buffer, for identifying a pair of clock reference packets in said buffer, said pair of clock reference packets including a first clock reference packet having an output time stamp and a second clock reference packet, computing a difference between a time value of said second clock reference packet and a time value of said first clock reference packet; calculating an output time stamp for said second clock reference packet in response to said output time stamp of said first clock reference packet and said difference; and adjusting each output time stamp of each transport stream packet between said first clock reference packet and said second clock reference packet such that there is uniform time spacing between each said transport stream packet;
a network interface for extracting groups of said transport stream packets from data units transmitted over said network; and
an arrival time stamper for appending an arrival time stamp to each of said groups; and
a preliminary output time stamper for appending a preliminary output time stamp to each of said transport stream packets, the preliminary output time stamp being equal to the arrival time stamp plus a fixed initial nominal buffer delay;
wherein said output time stamp adjuster is further configured to revert to said preliminary output time stamp associated with said second clock reference packet in response to said output time stamp being greater than a current time value.

8. The apparatus of claim 7, wherein said output time stamp adjuster is further configured to:
calculate an increment value in response to at least one transport stream packet of said transport stream packets between said first clock reference packet and said second clock reference packet; and
compute an output time stamp for each said at least one transport stream packet in response to said increment value.

9. The apparatus of claim 7, wherein said output time stamp adjuster is further configured to:
repeat said identifying, computing, calculating, and adjusting for one or more additional pairs of clock reference packets.

10. The apparatus of claim 7, wherein said output time stamp adjuster is further configured to
calculate a clock adjustment value for said output time stamp of said second clock reference packet; and
adjust said output time stamp for said second clock reference packet in response to said clock adjustment value.

11. Apparatus for processing transport stream packets received from a network for distribution to user terminals, comprising:
means for extracting groups of said transport stream packets from data units transmitted over said network;
means for appending an arrival time stamp to each of said groups;
means for appending a preliminary output time stamp to each of said transport stream packets, the preliminary output time stamp being equal to the arrival time stamp plus a fixed initial nominal buffer delay;
means for identifying a pair of clock reference packets in said transport stream packets, said pair of clock reference packets including a first clock reference packet having an output time stamp and a second clock reference packet;
means for computing a difference between a time value of said second clock reference packet and a time value of said first clock reference packet;
means for calculating an output time stamp for said second clock reference packet in response to said output time stamp of said first clock reference packet and said difference;
means for adjusting each output time stamp of each transport stream packet between said first clock reference packet and said second clock reference packet such that there is uniform time spacing between each said transport stream packet; and
means for reverting to said preliminary output time stamp associated with said second clock reference packet in response to said output time stamp being greater than a current time value.

12. A computer readable storage medium including stored program instructions that instruct a computer to perform a method of:
extracting groups of said transport stream packets from data units transmitted over said network;
appending an arrival time stamp to each of said groups;
appending a preliminary output time stamp to each of said transport stream packets, the preliminary output time stamp being equal to the arrival time stamp plus a fixed initial nominal buffer delay;
identifying a pair of clock reference packets in said transport stream packets, said pair of clock reference packets including a first clock reference packet having an output time stamp and a second clock reference packet;

computing a difference between a time value of said second clock reference packet and a time value of said first clock reference packet;

calculating an output time stamp for said second clock reference packet in response to said output time stamp of said first clock reference packet and said difference;

adjusting each output time stamp of each transport stream packet between said first clock reference packet and said second clock reference packet such that there is uniform time spacing between each said transport stream packet; and reverting to said preliminary output time stamp associated with said second clock reference packet in response to said output time stamp being greater than a current time value.

* * * * *